United States Patent
Kakimoto

(10) Patent No.: US 7,881,170 B2
(45) Date of Patent: Feb. 1, 2011

(54) RECORDING POWER CORRECTION METHOD AND RECORDING AND REPRODUCTION APPARATUS FOR OPTICAL DISK

(75) Inventor: Hiroya Kakimoto, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 540 days.

(21) Appl. No.: 11/936,700

(22) Filed: Nov. 7, 2007

(65) Prior Publication Data
US 2008/0151714 A1    Jun. 26, 2008

(30) Foreign Application Priority Data
Nov. 16, 2006   (JP) .............................. 2006-309878

(51) Int. Cl.
*G11B 7/00*   (2006.01)
(52) U.S. Cl. .................................................. 369/47.53
(58) Field of Classification Search ........................ None
See application file for complete search history.

(56) References Cited

U.S. PATENT DOCUMENTS

| | | | |
|---|---|---|---|
| 7,295,500 B2 * | 11/2007 | Nakano et al. ............ | 369/47.53 |
| 7,599,271 B2 * | 10/2009 | Minemura ................. | 369/59.11 |
| 2004/0160874 A1 * | 8/2004 | Hwang et al. ............. | 369/47.53 |
| 2005/0147007 A1 * | 7/2005 | Nakano et al. ............ | 369/47.53 |
| 2006/0023591 A1 * | 2/2006 | Ushiyama et al. ......... | 369/47.53 |
| 2006/0153042 A1 * | 7/2006 | Chang ...................... | 369/59.22 |
| 2006/0203642 A1 * | 9/2006 | Kakimoto et al. ......... | 369/47.31 |
| 2007/0159946 A1 * | 7/2007 | Kakimoto et al. ......... | 369/59.17 |
| 2008/0151714 A1 * | 6/2008 | Kakimoto ................. | 369/47.53 |
| 2009/0073846 A1 * | 3/2009 | Tsukahara et al. ......... | 369/100 |

FOREIGN PATENT DOCUMENTS

JP    2004-234812        8/2004
WO   WO 2006/001423 A1   1/2006

\* cited by examiner

*Primary Examiner*—Peter Vincent Agustin
(74) *Attorney, Agent, or Firm*—Law Office of Katsuhiro Arai

(57) ABSTRACT

Correction of recording power is appropriately performed to an optical disk. The recording power correction method includes a step of temporarily stopping data recording into an optical disk, reproducing a result of the relevant data recording, and specifying a detection pattern including a predetermined code in a reproduction signal; a step of detecting a signal state in the reproduction signal corresponding to the detection pattern; and a determination step of determining at least a correction direction of recording power in the data recording based on the detected signal state and a reference state specified from the detection pattern. Processing is performed on the basis of the detection pattern in this way, thereby the method can cope with even a recording and reproduction system for optical disk employing the PRML signal processing method.

13 Claims, 8 Drawing Sheets

EFFECTIVE DIAMETER OF SPOT>MARK LENGTH (a)

EFFECTIVE DIAMETER OF SPOT<MARK LENGTH (b)

RECORDING POWER CORRECTION METHOD AND RECORDING AND REPRODUCTION APPARATUS FOR OPTICAL DISK

BACKGROUND OF THE INVENTION

1. Field of the Invention

The present invention relates to a correction technique of recording power during data recording into an optical disk.

2. Description of the Related Art

An optical disk such as CD-R (write-once type CD), DVD±R (write-once type DVD), HD-DVD-R (write-once type HD-DVD), or BD-R (write-once type Blu-ray disc) has a structure where a recording layer, reflective layer, and protective layer as needed are formed on one surface of an optical transparency disk substrate. Moreover, spiral or concentric-circle grooves are formed on the surface on which the recording layer and the reflective layer are formed, and a portion between adjacent grooves is formed to be a convex portion called land. In such an optical disk, a recording laser beam forms pits in the recording layer by irradiating the recording layer over the grooves with the beam tracking along the grooves by a recording and reproduction device for optical disk. While the pits have a length nT (bit length between respective reference channel clocks is assumed to be T, and length of integral multiples of n of the bit length is assumed to be nT), and portions between the pits (hereinafter, called spaces) also have a length nT, arrays of them are irradiated with a laser beam for reproduction, and a reflected beam is converted into a reproduction signal, so that reproduction is performed.

The recording and reproduction device for optical disk is designed so as to meet a recording condition that is varied every time when recording is performed due to a drive, an optical disk (sometimes called media), recording velocity and the like. To meet the various recording conditions, the recording and reproduction device for optical disk employs a technique for optimally setting laser radiation intensity (hereinafter, called recording power). A device is given as such a technique, which uses OPC (Optimal Power Calibration) as a selection method. In the OPC, test recording is performed into a test area (Power Calibration Area) of a recording disk while changing output of a recording laser beam before data recording is performed. Then, each of results of the test recording is compared to a result based on a previously registered, initial condition, and therethrough best recording power providing excellent recording quality is selected from the results, and set. Recording is performed into a data recording area of the optical disk using the set recording laser beam with the best recording power.

Then, as a parameter showing a recording condition, a value of $\beta$, which is one type of asymmetry being an evaluation index showing asymmetry of a waveform formed by reproducing a recording waveform, is calculated from change in recording and reproduction signal when a recording power condition is changed, and the value of $\beta$ is determined so as to be equal or close to a target value, so that best recording power is obtained for best recording correction.

Moreover, a device employing a technique (ROPC: Running Optimal Power Calibration) is known, in which, to cope with change in characteristic (sensitivity) depending on thickness variation from inner circumference to outer circumference of an optical disk or influence of a warp of the optical disk, a return beam (WRF) to a spot of a recording laser beam is detected during data recording, or a sub-spot provided near a main spot is detected by using optical diffraction during the data recording, thereby the value of $\beta$ as above, jitter (fluctuation in a time axis direction of a digital signal), or a value of an evaluation index in a correlation with the jitter, is acquired so that the recording power condition is optimized in real time for the optical disk itself or the recording and reproduction device for optical disk.

Furthermore, a device is disclosed as a simple approach of the above technique, which employs a technique (WOPC: Walking Optical Power Calibration) in which during data recording from inner circumference to outer circumference of an optical disk, recording operation is temporarily stopped at a predetermined position on the optical disk, and data area, to which recording is performed immediately before such operation stop, is subjected to reproduction, thereby the value of $\beta$, jitter, or the value of the evaluation index in a correlation with the jitter, is acquired in order to optimize the recording power condition. For example, JP-A-2004-234812 is given as a reference.

However, when using WOPC with a DVD (Digital Versatile Disc), an evaluation technique using a value of $\beta$ as an index does not sufficiently cope with a recording and reproduction system for optical disk for high density recording and reproduction using the PRML (Partial Response Maximum Likelihood) signal processing method (system according to the Blu-ray standard or the HD-DVD standard) and consequently the WOPC cannot appropriately correct recording power in the system.

Moreover, the usual techniques have a problem that they cannot cope with an optical disk for high density recording and reproduction, in which the value of $\beta$, or asymmetry as an evaluation index being similar to $\beta$ but calculated by a different method, is not in a correlation with recording power and consequently the techniques cannot appropriately correct recording power.

SUMMARY OF THE INVENTION

The invention was made noticing the above points, and an object of the invention is to provide a correction technique of recording power that can cope with even the recording and reproduction system for optical disk for high density optical recording and reproduction (hereinafter, called high density optical recording and reproduction device).

Another object of the invention is to provide a technique that enables appropriate correction of recording power using a novel evaluation index.

Still another object of the invention is to provide a technique for updating correction data of recording power such that recording power of a high density optical recording and reproduction device can be more accurately corrected.

A recording power correction method according to a first technical approach of the invention includes a step of performing data recording into an optical disk, then temporarily stopping the data recording, reproducing a certain period in the data recording, and detecting a reproduction signal caused by the reproduction; a step of specifying a detection pattern including a predetermined code from the reproduction signal that was detected; a step of detecting a signal state in the reproduction signal corresponding to the detection pattern; and a step of determining a correction direction and amount of correction of recording power in the data recording based on the signal state that was detected, and a reference state specified from the detection pattern. Thus, the objects are achieved.

According to the first technical approach, processing is performed on the basis of the detection pattern in this way, thereby even a high density optical recording and reproduction device employing the PRML signal processing method can be appropriately corrected in recording power.

Moreover, the predetermined code is sometimes a code having a length nearest to effective diameter of a spot of a laser beam for reproduction. While described in detail below, by noticing such a code, the technical approach can cope with an optical disk in which β or asymmetry is not correlated with recording power.

Furthermore, the reference state is sometimes a theoretical value corresponding to the detection pattern. Moreover, the reference state is sometimes determined based on data obtained in pre-adjustment of the recording power performed before the data recording.

Moreover, the amount of correction of the recording power is sometimes a predetermined fixed amount. That is, only the correction direction is determined in the determination step, and the amount of correction is fixed.

On the other hand, the determination step may include a step of calculating the amount of correction of the recording power based on difference between the signal state and the reference state, and a predetermined relationship between the signal state and the reference state. In this way, the amount of correction is calculated on the basis of a novel evaluation index of difference between the signal state and the reference state. Thus, even the high density optical recording and reproduction device can be appropriately corrected in the recording power. The difference between the signal state and the reference state may include information on polarity (for example, plus or minus).

Furthermore, the predetermined relationship between the signal state and the reference state may be specified by a relational expression between the signal state and the reference state or a table showing that relational expression, which is obtained in pre-adjustment of the recording power performed before the data recording.

Moreover, the signal state and the reference state are sometimes specified by an amplitude level of the reproduction signal respectively. On the other hand, they are sometimes specified by information of length between two points at which a certain slice level intersects with the reproduction signal in an area where difference between the signal state and the reference state appears.

A recording power correction method according to a second technical approach of the invention includes a step of performing data recording into an optical disk, then temporarily stopping the data recording, reproducing a certain period in the data recording, and detecting a reproduction signal caused by the reproduction; a step of specifying a detection pattern including a code having a length nearest to effective diameter of a spot of a laser beam for reproduction from the reproduction signal that was detected; a step of detecting a signal state in the reproduction signal corresponding to the detection pattern; and a correction step of performing correction of recording power in the data recording based on the signal state that was detected. Thus, the objects are achieved.

According to the second technical approach, the code having the length nearest to the effective diameter of the spot of the laser beam for reproduction is noticed, and correction of recording power is performed using the novel evaluation index, thereby recording power can be more appropriately corrected.

Moreover, the signal state may be an amplitude level. In such a case, the correction step may include a step of calculating a value of asymmetry according to the code having the length nearest to the effective diameter of the spot of the laser beam for reproduction. A novel evaluation index is introduced in this way, thereby the correction amount of recording power can be appropriately set.

Furthermore, the signal state may be an amplitude level. In such a case, the correction step may include a step of calculating a value of a numerical aperture or amplitude level variation according to the code having the length nearest to the effective diameter of the spot of the laser beam for reproduction. A novel evaluation index may be introduced in this way.

A recording power correction method according to a third technical approach of the invention includes a step of performing data recording into an optical disk, then temporarily stopping the data recording, reproducing a certain period in the data recording, and detecting a reproduction signal caused by the reproduction; a step of specifying a detection pattern including a predetermined code from the reproduction signal that was detected; a step of detecting a signal state in the reproduction signal corresponding to the detection pattern; an evaluation value calculation step of calculating an evaluation value based on the signal state that was detected; and a step of using recording power in the data recording and the evaluation value to correct a correction expression or correction table of the recording power. Thus, the objects are achieved.

According to the third technical approach, the correction expression or correction table for the recording power is corrected in this way, thereby correction of the correction expression or the correction table of the recording power is advanced every time when the recording power correction method according to the third aspect of the invention is carried out, and correction data of the recording power can be updated such that the recording power can be more accurately corrected, consequently appropriate data recording is performed.

Moreover, a reference state specified from the detection pattern may be further used to calculate the evaluation value in the evaluation value calculation step.

Furthermore, the evaluation value may be a value of asymmetry, a numerical aperture, or amplitude level variation according to a code having a length nearest to effective diameter of a spot of a laser beam for reproduction.

Moreover, the evaluation value may be a value based on difference between the detected signal state and the reference state specified from the detection pattern. Moreover, the evaluation value may be a length between two points at which a certain slice level intersects with the reproduction signal.

A program for allowing a processor to execute the recording power correction method of the invention can be produced. That program is stored in a storage medium or a storage device such as an optical disk including flexible disk or CD-ROM, or magneto-optical disk, a semiconductor memory, and a hard disk. Moreover, the program is sometimes distributed by a digital signal via a network. Data during processing are temporarily stored in a storage device such as a memory of the processor.

DESCRIPTION OF THE PREFERRED EMBODIMENTS

Further information on the following embodiments may be found in Japanese Patent Application No. 309878/2006, filed on Nov. 16, 2006, which is hereby incorporated by reference in its entirety.

Figure 1:
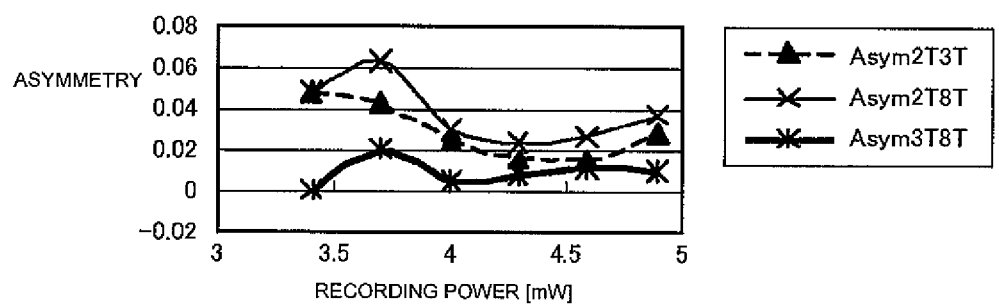
FIG. 1 is a diagram showing a relationship between usual asymmetry and recording power.

A method has been used, in which change in value of an evaluation index such as asymmetry or β is used to evaluate recording power. However, as shown in FIG. 1, a condition where the index is not in a correlation with the recording power may occur at a high possibility in an optical disk for high density optical recording and reproduction (optical disk according to the Blu-ray standard or the HD-DVD standard, hereinafter, simply called "high density optical disk"). In FIG. 1, a vertical axis shows a value (level) of asymmetry, and a horizontal axis shows recording power, and plotted data show how asymmetry changes when recording power is changed. FIG. 1 shows change in value of asymmetry of 2T3T, change in value of asymmetry of 2T8T, and change in value of asymmetry of 3T8T. While only asymmetry of shortest and longest symbols is typically used, a value of asymmetry of the shortest symbol and a second shortest symbol, and a value of asymmetry of the second shortest symbol and the longest symbol were used according to the HD-DVD standard. When the value of asymmetry of 2T8T and the value of asymmetry of 3T8T are particularly noticed, values of each kind of asymmetry form a curve in a manner of waving with an approximately certain value as a center, which shows an extremely low correlation with recording power.

Therefore, intensity of recording power cannot be appropriately evaluated only by using the values of asymmetry or the like as an evaluation index.

The asymmetry described herein is a value showing asymmetry of an eye pattern as β, and an evaluation index obtained as follows when an HF signal is obtained from recording data read by an optical pickup in an evaluation circuit system in DC (direct current) connection, and it is assumed that a maximum amplitude level at a space side is I2S, a minimum amplitude level at a pit side is I2P, a minimum amplitude level at a space side is I8S, and a maximum amplitude level at a pit side is I8P, the evaluation index is obtained by the following expression.

$$\text{Asymmetry} = \{(I2S + I2P)/2 - (I8S + I8P)/2\}/(I8S - I8P)$$

Thus, a new evaluation index for appropriately evaluating intensity of recording power is investigated. First, a detection pattern (appearance pattern of marks and spaces) for detecting change in recording condition due to recording power is considered.

Figure 2:
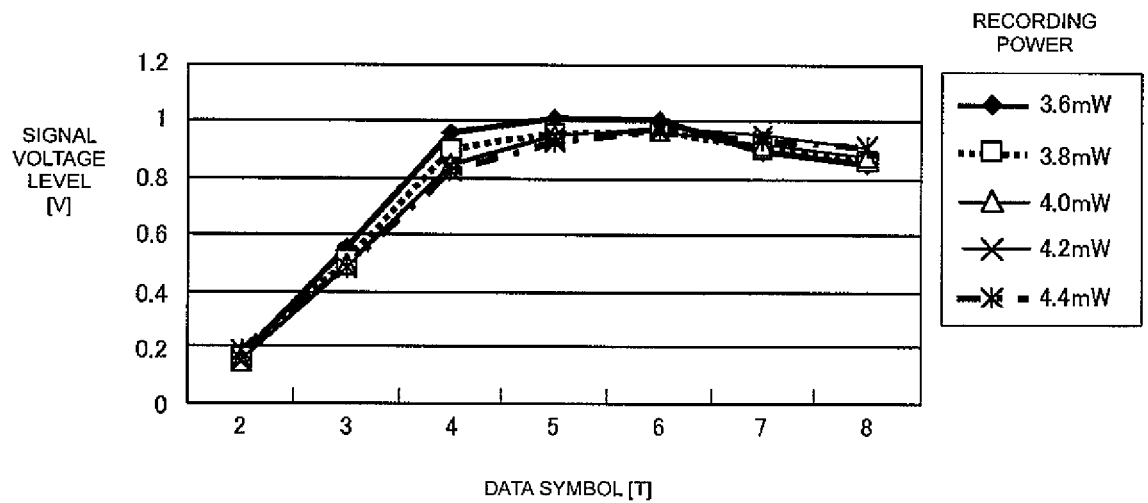
FIG. 2 is a diagram showing a relationship between data symbol length and a signal voltage level.

FIG. 2 shows change in amplitude level of each code (mark of length nT) in the case that recording power is changed. That is, in FIG. 2, a vertical axis shows an amplitude level in a form of a signal voltage level, and a horizontal axis shows a data symbol (n of the mark of length nT is an integer between 2 and 8 in the Blu-ray standard, and an integer between 2 and 11 in the HD-DVD standard). As seen from FIG. 2, several kinds of recording power are given as a parameter, and the amplitude level reaches a peak level between 4T and 6T in any kind of recording power, and the relevant amplitude level is extremely slightly different from an amplitude level of a code having a length longer than the relevant length.

Figure 3:
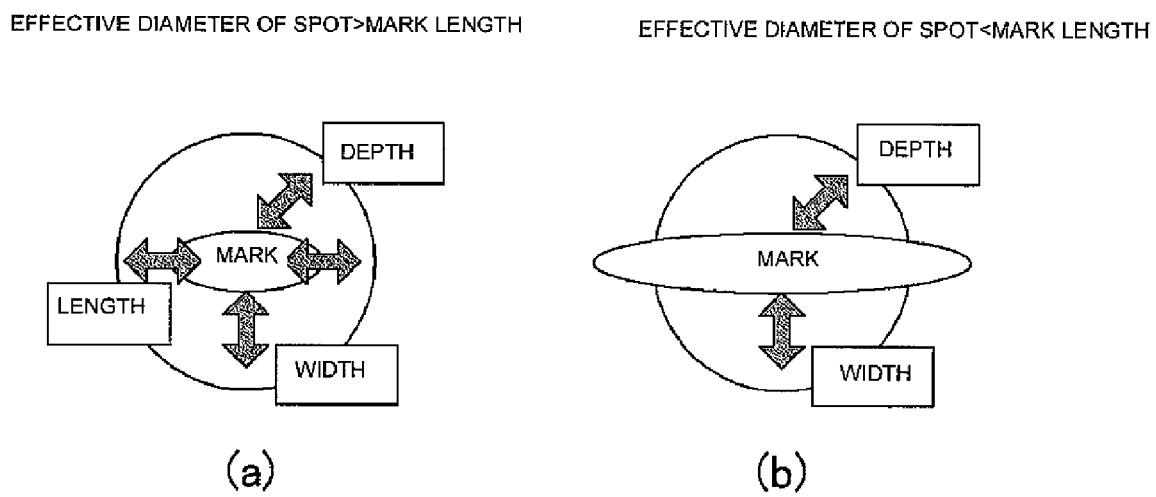
FIGS. 3A and 3B are diagrams showing a relationship between effective diameter of a spot and mark length respectively.

This is because when a laser beam for reproduction is focused on a pit or the like, a spot of the laser beam has an effective diameter (≅0.4 μm). When mark length of a pit is shorter than the effective diameter of the spot of the laser beam for reproduction as shown in FIG. 3A, a signal voltage level as the amplitude level is changed in proportion to the mark length, and when the mark length is sufficiently larger than the effective diameter of the spot as shown in FIG. 3B, the signal voltage level is not significantly influenced by the mark length.

In other words, while change in length, width and depth of a mark is an amplitude variation factor in the case that effective diameter of a spot is longer than mark length, change in length of a mark is not an amplitude variation factor, and only change in width and depth of a mark is an amplitude variation factor in the case that effective diameter of a spot is shorter than mark length.

In this way, due to total effects of respective amplitude variation factors, a value of the asymmetry of 2T8T, which is calculated from an amplitude level of a mark of 2T in which effective diameter of a spot is longer than mark length, and an amplitude level of a mark of 8T in which effective diameter of a spot is shorter than mark length, becomes an index being not significantly changed with change in recording power.

Figure 4:
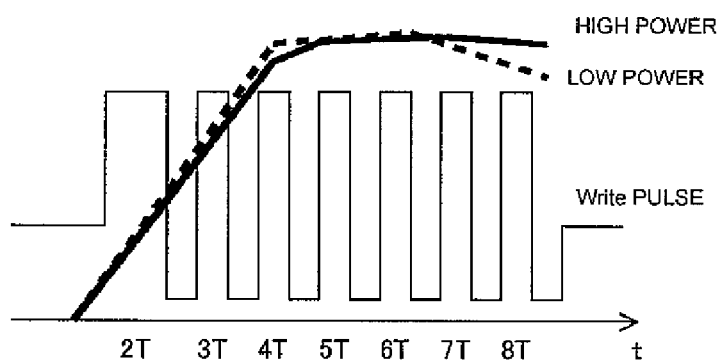
FIG. 4 is a diagram showing a relationship between time (mark of length nT) and an amplitude level during reproduction.

Here, FIG. 4 shows summary of only change in minimum power and change in maximum power in the amplitude change model when recording power is changed as shown in FIG. 2. In FIG. 4, a vertical axis shows an amplitude level, and a horizontal axis shows time and corresponding data symbols in proportion to time. For reference, a pulse for writing the corresponding code data is shown so as to be able to correspond to the amplitude change model. Referring to FIG. 4, as power is increased, more time is required before the amplitude level reaches the peak. For example, when power is low, the time before it reaches the peak requires only a short time corresponding to 4T. However, when power is high, it requires a time corresponding to 5T. Therefore, it can be confirmed from the data that the mark of 4T is most significantly subjected to influence of recording power on the relevant peak level. That is, recording power in forming the mark of 4T is in a correlation with the amplitude level in reproducing the mark of 4T in a manner that the recording power has influence on the amplitude level.

The reason for occurrence of such a phenomenon is that effective diameter of a spot of a laser beam for reproduction is approximately 0.4 μm in the Blu-ray standard, and code length of the mark of 4T is 0.447 μm that is most similar to the effective diameter of the spot. That is, code length of the mark or the like is varied due to intensity of recording power, which resultantly exerts large influence to the amplitude level in reproduction. To show numeral values of code length of 3T and code length of 5T for reference, the code length of 3T is 0.335 μm, and the code length of 5T is 0.559 μm.

Figure 5:
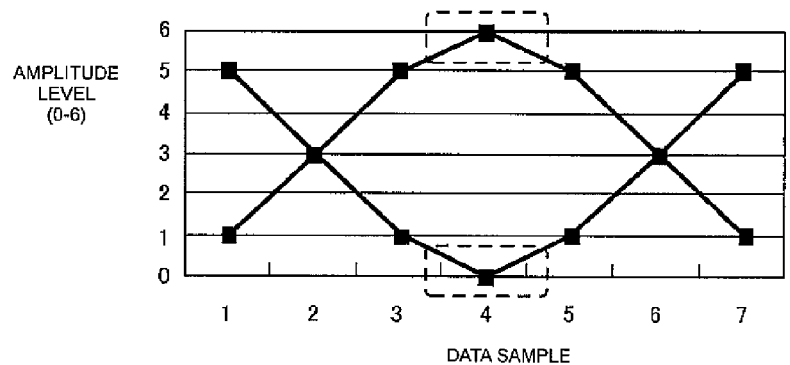
FIG. 5 is a diagram showing a relationship between a data sample and an amplitude level.

FIG. 5 shows an ideal state transition chart of PR (1, 2, 2, 1) used in the Blu-ray standard. PR is abbreviation of partial response, and it shows imperfect frequency response, in which inter-symbol interference is remained, with respect to frequency response for achieving a distortionless condition, and relates to a signal processing method for covering reduction in signal quality for removing inter-symbol interference in combination with a technique of maximum likelihood decoding. In the FIG. 5, an amplitude level of 4t mark is shown by an upward curve, and just reaches a peak value 6 of amplitude peak levels (levels of 0 to 6). Respective plots of amplitude levels of data samples as shown in FIG. 5 correspond to values given by converting ideal signals into amplitude levels, the ideal signals being obtained from profile values (1, 3, 5, 6, 5, 3, 1) given by calculating mark length of 4T according to the Viterbi algorithm at a condition of "Low to High". On the other hand, an amplitude level of the 3T mark does not reach the amplitude peak level as clear from FIGS. 2 and 4. Again from this, it is seen that the 4T mark is most influenced by recording power. In FIG. 5, a downward curve shows an ideal state transition in the case of a space of 4T. This shows that the amplitude level of the 4T mark is largely changed depending on recording power. In profile values given by calculating the mark length of 4T according to the Viterbi algorithm at a condition of "High to Low", profile values of respective data samples of marks and spaces in FIG. 5 are interchanged.

From the above reason, a code pattern is used as a detection pattern, which is centered at the 4T mark, and under influence of adjacent spaces, and a recording condition of the code pattern is grasped as a signal condition, thereby recording power can be adjusted. Each of code conditions before and after the 4T mark is desirably specified to be a space symbol being so long that inter-symbol interference does not have problematic influence on the space symbol, or specified to be, for example, a code condition of the 3T space or more so as to be not influenced by a code pattern. Consequently, if a set code pattern of 3T space, 4T mark, and 3T space, a set code pattern of 4T space, 4T mark, and 4T space, a set code pattern of 5T space, 4T mark, and 5T space, and a set code pattern of 6T space, 4T mark, and 6T space are used, the objects of the invention can be achieved without error.

The code of the 4T mark is specified from effective diameter of a spot of a laser beam for reproduction for BD-R in the Blu-ray standard, and the 4T mark is not necessarily suitable in all cases. One of ordinary skill in the art would understand the appropriate mark from the above description. For example, in PR (1, 2, 2, 2, 1) used in the HD-DVD standard, a code pattern is preferably used as a detection pattern, which is centered at the 5T mark, and under influence of adjacent spaces. Each of code conditions before and after the 5T mark is desirably specified to be a space symbol being so long that inter-symbol interference does not have problematic influence on the space symbol, or specified to be, for example, a code condition of the 4T space or more so as to be not influenced by a code pattern. Consequently, if a set code pattern of 4T space, 5T mark, and 4T space, a set code pattern of 5T space, 5T mark, and 5T space, a set code pattern of 6T space, 5T mark, and 6T space, and a set code pattern of 7T space, 5T mark, and 7T space are used, the objects of the invention can be achieved without error.

Embodiment 1

Figure 6:
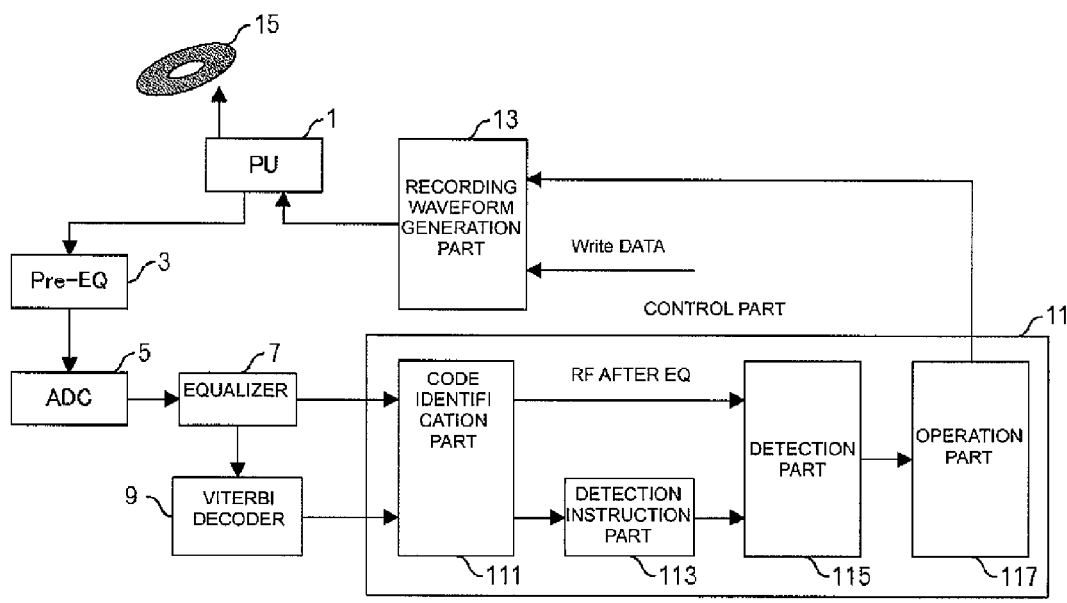
FIG. 6 is a functional block chart of a recording and reproduction system for optical disk according to an embodiment of the invention.

FIG. 6 shows a functional block chart of a high density optical recording and reproduction device according to a first embodiment of the invention. The high density optical recording and reproduction device according to the embodiment has an optical unit (PU) 1 for irradiating a laser beam to a high density optical disk 15 to perform the recording and reproduction; a pre-equalizer (Pre-EQ) 3 for performing equalization of a waveform so as to easily convert an electric signal from a photodetector included in the optical unit 1 into a digital signal in a subsequent step; ADC (Analog Digital Converter) 5 for converting an analog signal into a digital signal; an equalizer 7 that performs nonlinear equalization of a waveform for making amplitude of a shortest mark length to be close to amplitude of DVD or the like, that is, performs equalization of a binarized digital signal with a waveform, in which an amplitude level in a central position in a longitudinal direction of the 4T mark corresponds to a peak value, and values of amplitude levels, each of which may be more influenced by the adjacent 3T spaces at a position being more distant from the central position, are in an integral proportion (0/1/2/2/1/0) to one another, to imperfect frequency response having inter-symbol interference remained therein; a Viterbi decoder 9 that selectively decodes by conversion the waveform into a most likely, standard signal series among reproduction signals waveform-equalized by the equalizer 7, and outputs a maximum likelihood signal (signal returned into a binarized digital signal) being hardly influenced by a noise; a control part 11 for performing processing using output from each of the equalizer 7 and the Viterbi decoder 9; and a recording waveform generation part 13 that generates a recording waveform for write data depending on setting output from the control part 11, and outputs the waveform to the optical unit 1. In a configuration of such a high density optical recording and reproduction device, for example, since a shortest mark length of a pit recorded into a high density optical disk is 0.149 μm, which is short, 1/2.7 of that in the case of DVD, the mark length is close to a limit of optical resolution for an optical beam to be able to identify a pit. Moreover, when a pit row of a mark is reproduced using an optical beam, amplitude of a reproduction signal is reduced with decrease in mark length, and reduced to zero at the limit of resolution. Furthermore, in addition to such reduction in amplitude to zero, interference (called inter-symbol interference) occurs with adjacent marks in neighboring mark rows to be recorded, so that distortion appears in a reproduction signal. In consideration of such a special circumstance, the high density optical recording and reproduction device is configured to perform the PRML signal processing.

The control part 11 has a code identification part 111 that relates output of the equalizer 7 (RF signal given by reproduction in which a waveform is nonlinearly equalized) to output of the Viterbi decoder 9 (code data given by maximum likelihood decoding); a detection instruction part 113 that specifically instructs detection of an amplitude level when the part 113 detects a previously set detection pattern based on code data from the code identification part 111, for example, detects appearance of a state of recorded medium in an amplitude level of 4T mark influenced by adjacent 3T spaces; a detection part 115 that performs detection processing of a signal state in the amplitude level to an RF signal from the code identification part 111 according to an instruction from the detection instruction part 113; and an operation part 117, which has a memory that is not shown, generates a reference state based on output from the detection part 115, performs a processing operation as described below, and performs setting for the recording waveform generation part 13. In one embodiment, the operation part 117 may be achieved by a combination of a program for carrying out functions described below, and a processor. In such a case, a program may be stored in a memory within the processor or the program may be stored as executable instructions on a computer readable medium external to the processor.

Figure 7:
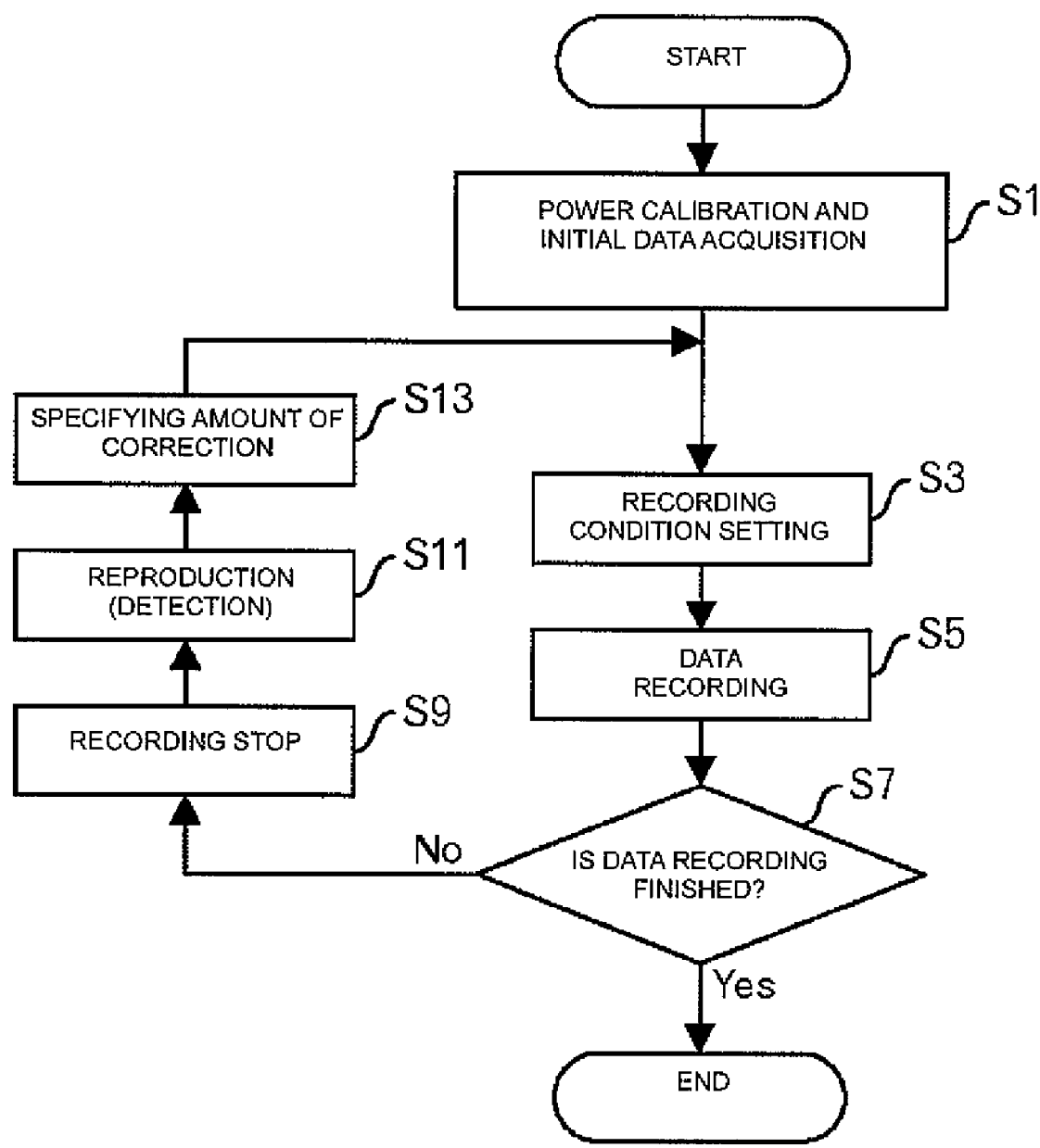
FIG. 7 is a chart showing a processing flow according to the embodiment of the invention.
Figure 8:
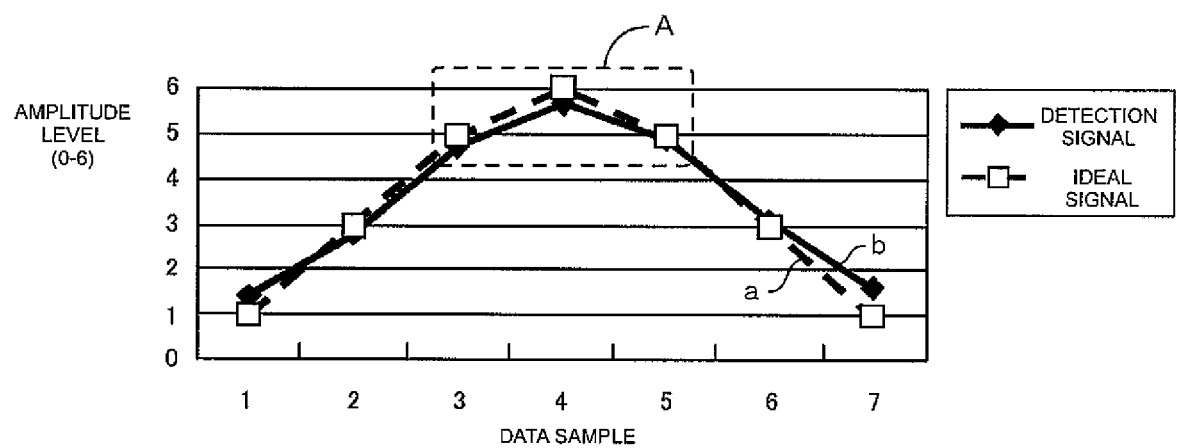
FIG. 8 is a diagram showing a relationship between a data sample and an amplitude level when a 4T mark is reproduced.

Next, description is made on processing contents of the high density optical recording and reproduction device as shown in FIG. 6 using FIGS. 6 to 8. First, determination of laser radiation intensity (called recording power) for appropriately performing recording, which is called power calibration, is carried out, and initial reference data are acquired (FIG. 7, step S1). For example, in FIG. 6, the operation part 117 of the control part 11 allows a predetermined pattern to be written at several kinds of recording power into a test write area provided, for example, on the most inner circumferential area of the optical disk 15, and determines initial recording power to the relevant optical disk 15 based on a predetermined reference. Since a specific procedure of such processing is disclosed in various literatures, and it is not a major part in the embodiment, further description of the processing is omitted.

Concurrently with reproduction operation performed in the power calibration, acquisition of the following initial reference data is carried out. In the following, description is made on a case that an RF signal including predetermined codes of "3T space, 4T mark, and 3T space" as a set pattern is specified as a detection pattern, and set in the detection instruction part 113. When the detection instruction part 113 detects the above detection pattern based on an RF signal equivalent to code data from the code identification part 111, the part 113 outputs detection instruction to the detection part 115. According to such output, the detection part 115 performs specifying of the predetermined codes of "3T space, 4T mark, and 3T space" as a detection pattern to the RF signal from the code identification part 111 in response to the detection instruction, and detects a signal state of the pattern as an amplitude level of a 4T mark influenced by 3T spaces before and after the 4T mark.

Processing by the detection part 115 is described using FIG. 8 with a relationship between plotted values given by calculating an amplitude level of a signal of the 4T mark length influenced by 3T spaces before and after the 4T mark in detected signals, and profile values in an ideal state of an ideal signal of the 4T mark length, the ideal state being calculated according to the Viterbi algorithm. In FIG. 8, a vertical axis shows the amplitude level, and a horizontal axis shows a data sample number. According to instruction from the detection instruction part 113 of FIG. 6, the detection part 115 detects amplitude levels (data sample values), for example, at seven points of detection of signal b as shown in FIG. 8 with a peak as a center, and outputs the amplitude levels to the operation part 117. It is noted that the seven points in FIG. 8 are illustrative only. A span of length to be detected may be wider than a span of code length of a detection object to take more data samples if it is without departing from the gist of the invention, for example, the span of length to be detected may be wider than a span corresponding to 4T in the case of a 4T mark, or may be wider than a span corresponding to 5T, for example, a span corresponding to 8T in the case of the 5T mark.

The operation part 117 specifies three points centered at the peak as an operation sample, the points being enclosed by a dotted line A in FIG. 8, and calculates an evaluation value ProfileGap by the following expression. The three points are illustrative only.

$$ProfileGap = \sum_{x=a}^{n-a+1} \{D(x) - R(x)\} \quad (1)$$

Here, D(x) indicates, for example, values of the detection signal b shown in FIG. 8 as data sample values, and R(x) indicates values of the ideal signal a shown in FIG. 8. A symbol x shows a data profile number (data sample number), symbol a shows an operation beginning data profile number, and symbol n shows the number of data samples. In an example of FIG. 9, a is 3, and n is 7.

In the expression (1), gaps between the detection signal b and the ideal signal a are summed at the three points enclosed by the dotted line A, and when the detection signal b is lower than the ideal signal a as shown in FIG. 8, recording power is insufficient, and conversely, when the detection signal b is higher than the ideal signal a, the recording power is excessive. This can be determined by a sign of the evaluation value ProfileGap, and consequently a correction direction on whether the recording power is insufficient or excessive, and the amount of the correction are obtained.

Such processing is carried out every time when the detection pattern is detected, and an average value of the evaluation values ProfileGap is calculated and related to a recording power value of each time, and then stored in a memory of the operation part 117.

The operation part 117 has a function of performing recurrence calculation to calculate a proportion coefficient of a line showing a relationship between the evaluation value ProfileGap (specifically an average value) and the recording power.

Figure 9:
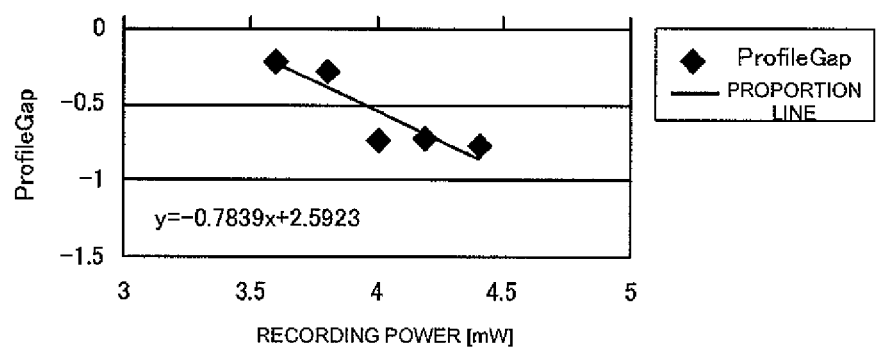
FIG. 9 is a diagram showing a relationship between recording power and an evaluation index ProfileGap.

FIG. 9 shows the relationship between the evaluation value ProfileGap (vertical axis y) and the recording power (horizontal axis x). In FIG. 9, the vertical axis shows the evaluation value ProfileGap, and the horizontal axis shows the recording power. Moreover, in a graph of FIG. 9, the evaluation values ProfileGap are plotted while changing measurement data as shown in FIG. 8 into data with recording power by each recording power as shown in the horizontal axis of FIG. 9, of which numeral values are stored in the memory in the operation part 117 of FIG. 6. A plotted result corresponds to respective rhombic points as shown in FIG. 9, and a linear expression (a proportion coefficient and an intercept) is calculated through recurrence calculation. The recurrence calculation may be performed also in step S1 of FIG. 7 in order to use the linear expression in the first step S13.

In an example of FIG. 9, as the recording power is increased, the evaluation value ProfileGap is decreased. This shows that as the recording power is increased, amplitude of the 4T mark is decreased with respect to a mark of long symbol of which the amplitude level reaches the peak.

The embodiment shows an example where original data for calculating a line as shown in FIG. 9 are acquired in the step S1 of FIG. 7. In an alternative embodiment, the original data for calculating the line as shown in FIG. 9 may be previously stored in the memory of the operation part 117 of FIG. 6, and used.

Furthermore, in the step S1 of FIG. 7, an evaluation value ProfileGap and profile data (respective data sample values of the detection signal b in FIG. 8) on recording power, which was determined to be optimal in power calibration according to another standard, are kept for subsequent processing. For the respective data sample values, for example, average values are used.

Returning to description of FIG. 7 in light of FIG. 6, the operation part 117 of FIG. 6 first sets a recording condition according to a result of power calibration, then sets a recording condition in the recording waveform generation part 13 based on a result of step S13 described later (FIG. 7, step S3).

Then, the recording waveform generation part 13 generates a recording waveform according to write data, and performs data recording into the optical disk 15 via the optical unit 1 (step S5). In the embodiment, for example, a predetermined amount of data are recorded, then predetermined time is passed, or recording velocity is changed, and then the control part 11 determines whether data recording is finished or not (step S7). When data recording is finished (step S7: Yes route), processing is finished. On the other hand, when data to be recorded are remained (step S7: No route), the control part 11 temporarily stops data recording (step S9). Then, the control part 11 performs reproduction (detection) of a portion into which data recording was performed after stopping data recording last time (step S11).

In step S11, the same operation as in the step S1 is performed as described before. In this operation, when the detection instruction part 113 detects the detection pattern of "3T space, 4T mark, and 3T space" based on the code data from the code identification part 111, the part 113 outputs detection instruction to the detection part 115. The detection part 115 performs detection of an amplitude level to an RF signal from the code identification part 111 in response to the detection instruction, and outputs the amplitude level to the operation part 117.

The operation part 117 specifies the three points centered at the peak as the operation sample, the points being enclosed by the dotted line A in FIG. 8, and calculates an evaluation value ProfileGap by the expression (1). In the expression (1), as the value of R(x), the value of the ideal signal a as shown in FIG. 8 may be used as itself, or profile data at optimal recording power may be used, which were acquired in power calibration of the step S1 or the like.

Such processing is carried out every time when the detection pattern is detected, and an average value of the evaluation values ProfileGap is calculated, and stored in the memory of the operation part 117 while being related to a recording power value in each time. Then, the operation part 117 performs recurrence calculation to a set of the average value of the evaluation values ProfileGap stored in the memory, and recording power, and recalculates a proportion coefficient of a line showing a relationship between the evaluation value ProfileGap (specifically an average value) and the recording power.

Then, the operation part 117 calculates amount of correction (including increase or decrease of the amount) of recording power using difference between an evaluation value ProfileGap calculated last time and an evaluation value ProfileGap at the optimal recording power, and the calculated, proportion coefficient of the line showing the relationship between the evaluation value ProfileGap (specifically the average value) and the recording power (step S13), and then processing is returned to the step S3, and the operation part 117 sets a recording condition in the recording waveform generation part 13. Here, the amount of correction is calculated using a product of the difference between the evaluation value ProfileGap calculated last time and the evaluation value ProfileGap at the optimal recording power, and the proportion coefficient.

In this way, while the line showing the relationship between the evaluation value ProfileGap (specifically the average value) and the recording power is corrected through learning, the amount of correction can be specified more appropriately.

While an embodiment in which learning was performed was shown in the above, one of ordinary skill in the art would recognize other embodiments. For example, it is also acceptable that determination is made only on whether the evaluation value ProfileGap is a positive value or a negative value without performing the recurrence calculation, and a predetermined fixed value (value calculated from measurement data) is specified as the amount of correction.

Embodiment 2

While the ProfileGap as a new evaluation index was introduced in the first embodiment, another evaluation index, or 4T asymmetry being not simple asymmetry, is introduced in another embodiment.

Figure 10:
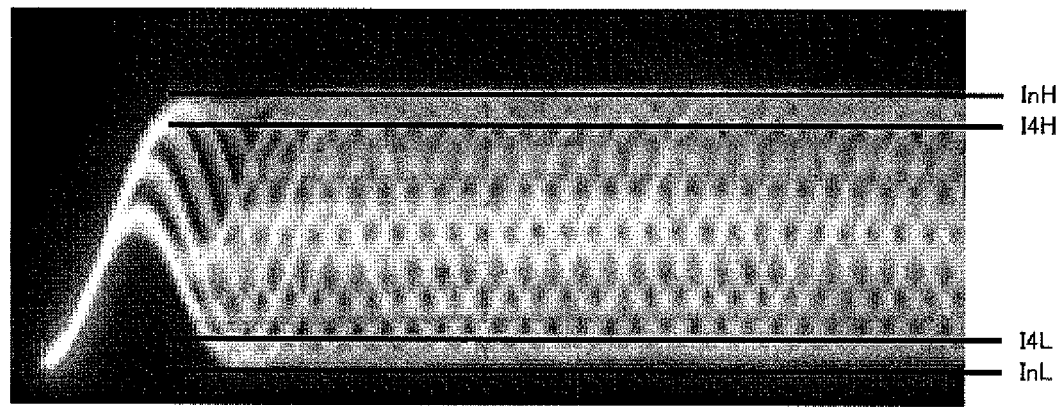
FIG. 10 is a waveform chart for explaining an amplitude level.
Figure 11:
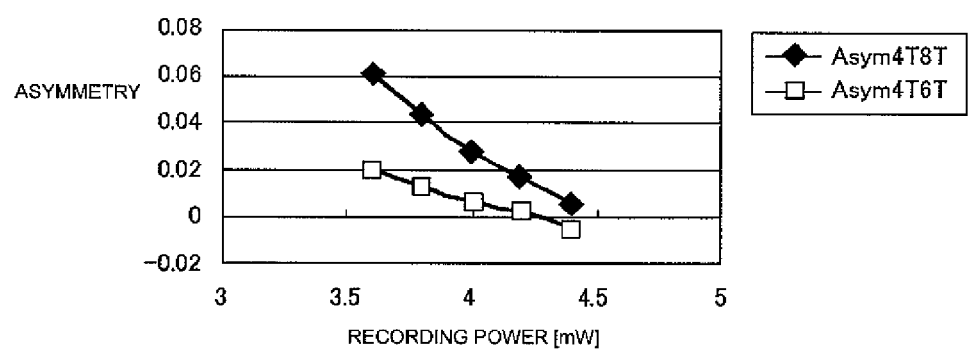
FIG. 11 is a diagram showing a relationship between 4T asymmetry and recording power.

For the following description, names of amplitude levels are described using FIG. 11. As shown in FIG. 10, amplitude levels of a 4T code are assumed to be I4H and I4L, and amplitude levels of a code having a code length nT are assumed to be InH and InL, the amplitude levels being corresponding or equivalent to peak values respectively.

Then, the 4T asymmetry is calculated by the following expression.

$$\text{Asym.}4T = \{(InH+InL)-(I4H+I4L)\}/\{2\times(InH-InL)\} \quad (2)$$

In the embodiment, the 4T asymmetry is used in place of the evaluation index ProfileGap in the first embodiment. The processing flow itself is not different from that in the first embodiment. It is noted that while asymmetry of the shortest symbol and longest symbol, and asymmetry of the shortest symbol and second-shortest symbol are usually used, the 4T asymmetry has not been noticed so far as asymmetry having a code length nearest to effective diameter of a spot, and it is novel as itself to conceive the approximately proportional relationship of the 4T asymmetry as a reference to recording power.

Figure 12:
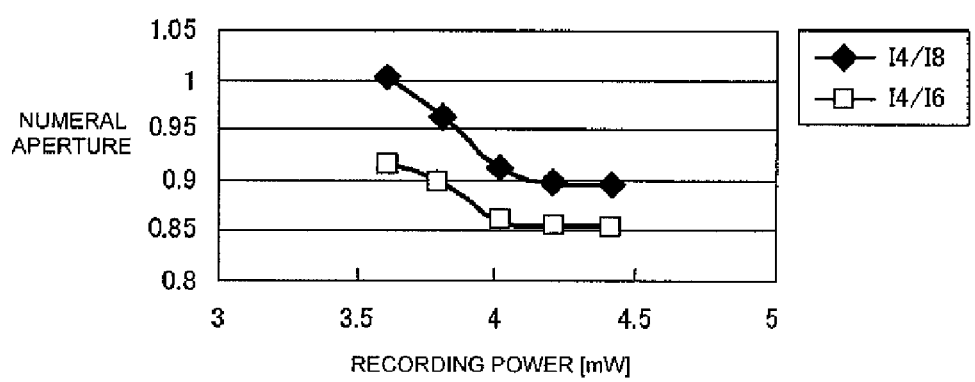
FIG. 12 is a diagram showing a relationship between a 4T numerical aperture and recording power.

FIG. 11 shows an example of a relationship between recording power, 4T asymmetry, and nT asymmetry. In FIG. 12, a horizontal axis shows recording power, and a vertical axis shows a value of asymmetry. FIG. 11 shows a case of n=6, namely, 4T6T asymmetry, and a case of n=8, namely, 4T8T asymmetry. In each case, as the recording power is increased, the value of 4T asymmetry is reduced. This is because when the recording power is increased, a 4T mark is disrupted in heat balance with respect to a mark of a long symbol of which the amplitude level reaches the peak.

Embodiment 3

In still another embodiment another evaluation index can be introduced. A numerical aperture of 4T, I4/In, as an evaluation index according to the embodiment is calculated as follows.

$$I4/In = (I4H-I4L)/(InH-InL) \quad (3)$$

In the embodiment, the numerical aperture of 4T, I4/In, is used in place of the evaluation index ProfileGap in the first embodiment. The processing flow itself is not different from that in the first embodiment.

Figure 13:
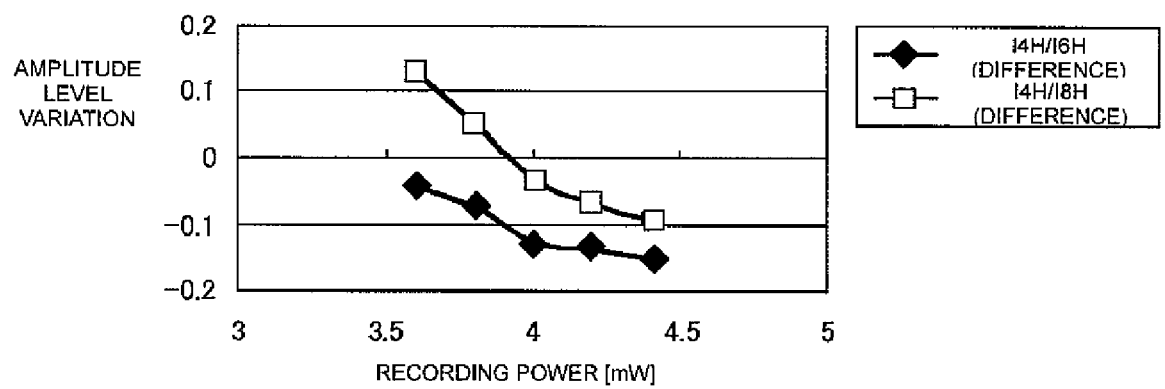
FIG. 13 is a diagram showing a relationship between amplitude level variation (difference) and recording power.

FIG. 12 shows an example of a relationship between recording power and the numerical aperture of 4T. In FIG. 13, a horizontal axis shows recording power, and a vertical axis shows a numerical aperture. FIG. 13 shows a case of n=6, namely, a numerical aperture of I4/I6, and a case of n=8, namely, a numerical aperture of I4/I8. In each case, as the recording power is increased, a numerical aperture of the mark 4T is reduced with respect to a mark of a long symbol of which the amplitude level reaches the peak.

Embodiment 4

In yet another embodiment, another evaluation index can be introduced. An amplitude level variation (I4H/InH) of an evaluation index 4T according to the embodiment is calculated by the following expression (4) or (5).

$$I4H/InH(\text{difference}) = (I4H - InH)/InH \quad (4)$$

$$I4H/InH(\text{ratio}) = I4H/InH \quad (5)$$

In the embodiment, the amplitude level variation (I4H/InH) of 4T is used in place of the evaluation index ProfileGap in the first embodiment. The processing flow itself is not different from that in the first embodiment.

FIG. 13 shows an example of a relationship between recording power and the amplitude level variation of 4T (difference). In FIG. 13, a horizontal axis shows recording power, and a vertical axis shows amplitude level variation. FIG. 13 shows a case of n=6, namely, amplitude level variation of I4/I6, and a case of n=8, namely, amplitude level variation of I4/I8. In each case, as the recording power is increased, amplitude level variation of the mark 4T is reduced with respect to a mark of a long symbol of which the amplitude level reaches the peak.

Figure 14:
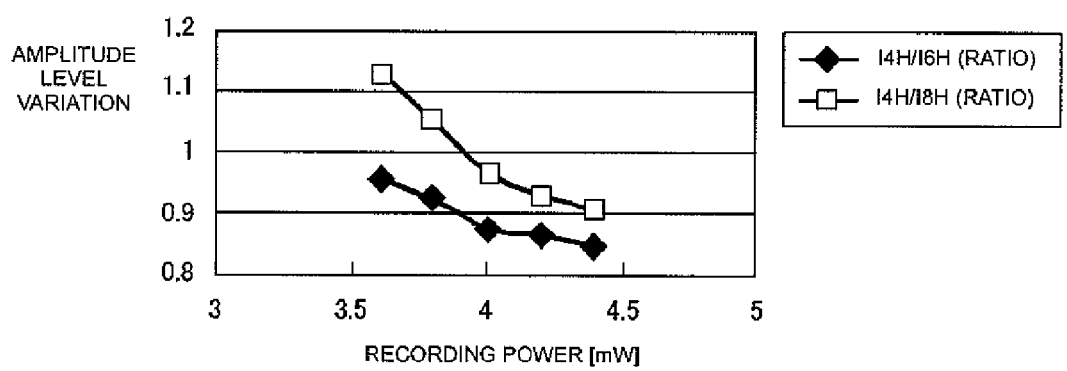
FIG. 14 is a diagram showing a relationship between amplitude level variation (ratio) and recording power.
Figure 15:
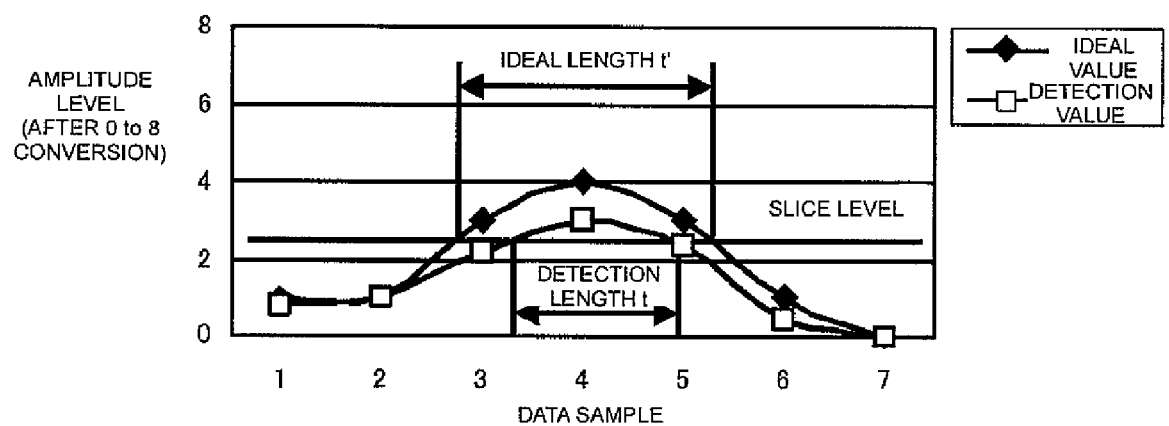
FIG. 15 is a diagram for explaining length (time) between intersections of a predetermined slice level and signals.

Similarly, FIG. 14 shows an example of a relationship between recording power and the amplitude level variation of 4T (ratio). In FIG. 15, a horizontal axis shows recording power, and a vertical axis shows amplitude level variation. FIG. 15 shows a case of n=6, namely, amplitude level variation of I4/I6, and a case of n=8, namely, amplitude level variation of I4/I8. In each case, as the recording power is increased, amplitude level variation of the mark 4T is reduced with respect to a mark of a long symbol of which the amplitude level reaches the peak.

Embodiment 5

In an additional embodiment, another evaluation index can be introduced. In the embodiment, for example, "3T space, 4T mark, and 3T space" is detected as a detection pattern, and as shown in FIG. 15, a slice level is given in an area where an amplitude level is different between an ideal signal and a detection signal, and time (detection length) t between intersections of a detection signal of the relevant detection pattern and a shown slice level is assumed to be D(x), and time (ideal length) t' between intersections of an ideal signal and the same slice level as the above is assumed to be R(x). However, it is assumed that values are not found except for a set of t and t'. Then, processing is performed according to the processing flow of the first embodiment. Accordingly, the same advantages as in the first embodiment can be obtained.

While the embodiments of the invention have been described hereinbefore, the invention is not limited to them. For example, the functional block chart of the optical recording and reproduction system shown in FIG. 7 is illustrative only, and the invention is not limited to a functional block configuration of FIG. 6 and may include other configurations as long as the described functions can be achieved.

Moreover, in each of the second to fourth embodiments, a relationship between the recording power and the evaluation index may be previously acquired in the power calibration, and may be used for calculation of the amount of correction, or similar data may be previously kept in a memory.

Moreover, it is also acceptable that a proportion coefficient of an expression is not kept, but a correction amount table corresponding to the expression is kept. One of ordinary skill in the art would recognize these and additional embodiments.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A recording power correction method comprising:
    performing data recording into an optical disk, temporarily stopping the data recording, and detecting a reproduction signal caused by reproduction of recorded data,
    specifying a detection pattern including a predetermined code from the reproduction signal that was detected,
    detecting a signal state in the reproduction signal corresponding to the detection pattern, and
    determining at least a correction direction of recording power in the data recording based on the signal state that was detected and a reference state specified from the detection pattern,
    wherein the reference state is determined based on the detection pattern obtained in pre-adjustment of the recording power performed before the data recording.

2. The recording power correction method according to claim 1, further comprising determining an amount of correction of recording power in the data recording based on the signal state that was detected and a reference state specified from the detection pattern.

3. The recording power correction method according to claim 2, wherein the amount of correction of the recording power is a predetermined fixed amount.

4. The recording power correction method according to claim 1, wherein the reference state is a theoretical value corresponding to the detection pattern.

5. The recording power correction method according to claim 1, wherein the signal state and the reference state are specified by an amplitude level of the reproduction signal respectively.

6. The recording power correction method according to claim 1, wherein each of the signal state and the reference state is specified by information of length between two points at which a slice level intersects with the reproduction signal within an area where difference between the signal state and the reference state exists.

7. A recording power correction method comprising:
    performing data recording into an optical disk, temporarily stopping the data recording, and detecting a reproduction signal caused by reproduction of recorded data,
    specifying a detection pattern including a predetermined code from the reproduction signal that was detected,
    detecting a signal state in the reproduction signal corresponding to the detection pattern,
    determining at least a correction direction of recording power in the data recording based on the signal state that was detected and a reference state specified from the detection pattern, and determining an amount of correction of recording power in the data recording based on the signal state that was detected and a reference state specified from the detection pattern, wherein the step of determining the correction direction and the amount of correction further comprises calculating the correction direction and the amount of correction based on a difference between the signal state and the reference state with one of the states as a reference, and a predetermined relationship between the signal state and the reference state.

8. The recording power correction method according to claim 7, wherein the predetermined relationship between the signal state and the reference state is specified by a relational expression between the signal state and the reference state or a table showing that relational expression, which is obtained in pre-adjustment of the recording power performed before the data recording.

9. A recording power correction method comprising:
performing data recording into an optical disk, temporarily stopping the data recording, and detecting a reproduction signal caused by reproduction of recorded data,
specifying a detection pattern including a predetermined code from the reproduction signal that was detected,
detecting a signal state in the reproduction signal corresponding to the detection pattern,
calculating an evaluation value based on the signal state that was detected, and
using recording power in the data recording and the evaluation value to correct a correction expression or correction table of the recording power,
wherein a reference state specified from the detection pattern is further used to calculate the evaluation value in the evaluation value calculation step,
wherein the evaluation value is a value based on a difference between the signal state that was detected and the reference state specified from the detection pattern.

10. The recording power correction method according to claim 9, wherein the evaluation value is a value selected from the group of asymmetry, numerical aperture, and amplitude level variation, according to a code having a length nearest to the effective diameter of the spot of a laser beam for reproduction.

11. The recording power correction method according to claim 9, wherein the evaluation value is a length between two points at which a slice level intersects with the reproduction signal in an area where difference between the signal state and the reference state exists.

12. A computer readable medium storing executable instructions for causing a processor to execute the recording power correction method of claim 1, 7, or 9.

13. A processor comprising a memory storing a program configured to execute the recording power correction method according to claim 1, 7, or 9.

* * * * *